United States Patent Office 3,381,785
Patented May 7, 1968

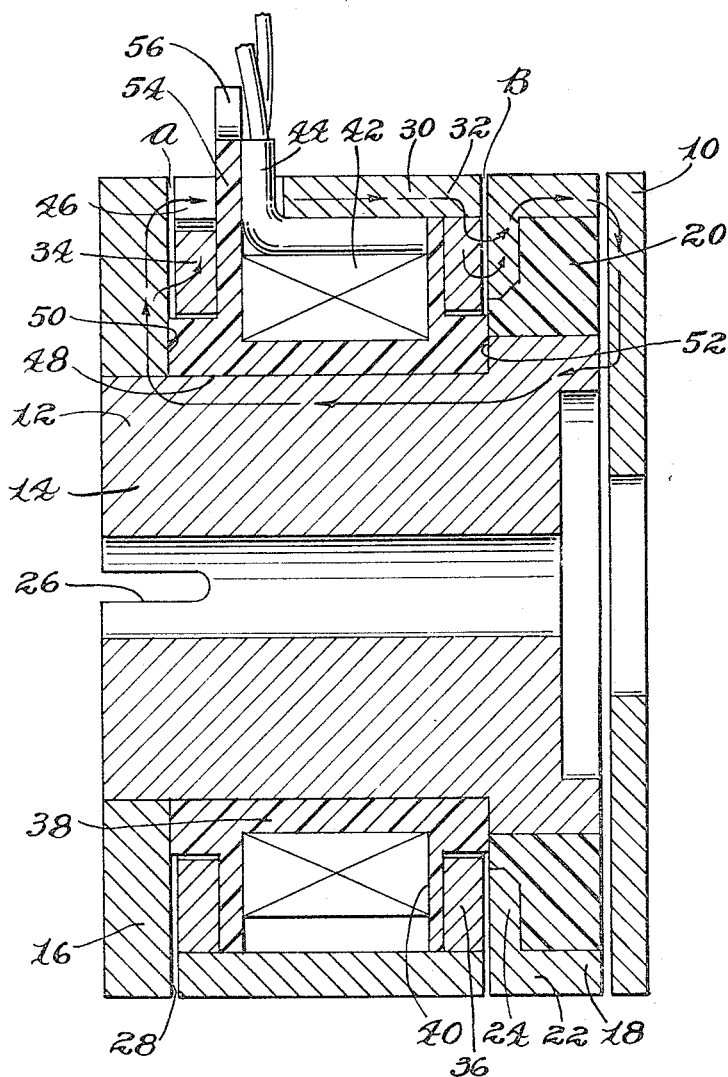

3,381,785
COMBINED COIL MOUNTING AND BEARING FOR AN ELECTROMAGNETIC CLUTCH
Charles A. Mendenhall, 303 Wisteria Way,
Horseheads, N.Y. 14845
Filed Oct. 26, 1966, Ser. No. 589,614
3 Claims. (Cl. 192—66)

ABSTRACT OF THE DISCLOSURE

The improvement in an electromagnetic clutch consisting of an annular bobbin for mounting a stationary electromagnetic coil; said bobbin has a U-shape cross sectional area and is made of plastic material having suitable bearing properties such as "Delrin." An input shaft is rotably mounted within and axially restrained by said bobbin; whereby, the need for conventional bearings is eliminated.

---

The present invention relates to an electromagnetic clutch and, more particularly, an electromagnetic clutch having a novel coil bobbin design.

Coils for electromagnetic clutches generally are of annular configuration and are fabricated by winding the coil on a preformed bobbin. The combined coil and bobbin thus becomes a sub-assembly which, during clutch manufacture, is inserted into the clutch structure as a unit and potted or otherwise affixed into position. In such prior art technique, the bobbin is thus first a winding form, and next a protective covering to protect against handling abuse during assembly and, finally, a coil holding casing in the final clutch unit with certain desired dielectric and flux non-conducting properties.

It is an object of the present invention to provide a clutch arrangement wherein the bobbin additionally provides the function of a bearing member in a stationary coil clutch between stationary magnet body and adjacent clutch rotating members, thus eliminating the need for separate bearing and spacing means which form a normal part of prior clutch designs.

It is an additional object to provide in an electromagnetic clutch a bobbin arrangement which serves to accept both radial and thrust bearing loads.

Other objects and advantages of the present invention will become apparent on consideration of the accompanying description and drawing.

The drawing illustrates a preferred embodiment of a clutch containing my novel bobbin arrangement wherein the greatest utility is realized in a stationary coil type clutch. The clutch is comprised of a first rotatable torque transmitting member or armature plate 10 and a second rotatable torque transmitting member 12. Armature plate 10 would be splined or otherwise connected to an output shaft, not shown, to permit a limited amount of axial travel.

Second torque transmitting member 12 is comprised of a cylindrical portion 14 extending in a clutch axial direction and first and second annular projections 16 and 18 at either end. Projection 16 is preferably fabricated as a separate piece press fitted or otherwise secured to cylindrical portion 14 to permit assembly of the clutch. Projection 18 is comprised of a ring of friction material 20 which passes entirely through the projection from right to left face as illustrated. Radially outwardly of friction ring 20 is a flux conducting ring 22 which has a depending radial flange 24 providing a broad face for receiving magnetic flux across an air gap. A key slot 26 is provided on the inner diameter of cylindrical portion 14 to permit attachment to a shaft.

The cylindrical portion 14 and annular projections 16 and 18 of the second torque transmitting member collectively define a first annular cavity 28. A stationary magnet body member 30 is comprised of a sleeve member 32 and radially inwardly depending flanges 34 and 36 at either end, press fitted or otherwise secured in position. The magnet body is disposed intermediate annular projections 16 and 18 and defines flux air gaps A and B at either end therewith.

A specially preformed annular plastic bobbin member 38 having a generally U-shaped cross section is fixedly secured to the magnet body 30 and defines a second annular cavity 40. Coil 42 is disposed within the bobbin and has electrical leads 44 which pass through a slot 46 formed in the sleeve member 32. The inner diametric surface 48 of bobbin 38 is in contractive sliding engagement with the outer surface of cylindrical portion 14 to provide a radial bearing connection between stationary magnet body and rotating second torque transmitting member. The axial ends 50 and 52 of the bobbin extend axially beyond the magnet body, and are in contactive sliding engagement with annular projections 16 and 18 to provide an axial thrust bearing connection. Bobbin 38 further contains a radially extending projection 54 which extends radially external to the magnet body and is notched at 56 to receive a fixed pin or the like, not shown. This projection serves the function of an anti-rotation tab maintaining the rotationally fixed position of the stationary magnet body.

Bobbin 38 is formed of a low friction plastic having suitable nonflux conducting properties. I have used successfully a plastic known in the art under the trade name "Delrin," and other materials are available which would be suitable.

Coil 42 would be wound on a preformed bobbin, assembled into the magnet body which is then inserted over cylindrical portion 14 and secured in position by projection 16. The combined assembly eliminates the need for separate radial and/or thrust bearing and separate non-rotation tabs, and thus represents a significant cost reduction over prior designs where separate structure was fabricated for these purposes. I have found in endurance tests that the bobbin will perform satisfactorily for most all applications as a bearing member, providing good support, acceptable wear and, of course, at very considerable savings in cost.

It will be apparent that the present invention may be applied to other clutch designs from that illustrated as a preferred embodiment without the exercise of invention or departing from the scope and spirit of the invention defined herein.

I claim.
1. An electromagnetic clutch comprising:
   first and second rotatable torque transmitting members, said torque transmitting members each having confronting clutch surfaces;
   said first torque transmitting members operative to move axially in response to magnetic attraction to engage and disengage said clutch surfaces;
   said second torque transmitting member having a first annular cavity formed intermediate its ends;
   a stationary magnet body member disposed within said cavity forming first and second air flux gaps at either axial end with said second torque transmitting member;
   an annular plastic bobbin member secured to said stationary magnet body member and having a generally U-shaped cross-section defining a second annular cavity radially inward of said magnet body member;
   an electromagnetic coil wound on said bobbin and disposed in said second annular cavity; and
   said bobbin member having an inner diametrical surface providing a radial bearing support for said second torque transmitting member.

2. An electromagnetic clutch as claimed in claim 1 wherein:
said bobbin member extends axially beyond said magnet body member into sliding contactive engagement with said second torque transmitting member to provide an axial thrust bearing therefor.

3. An electromagnetic clutch as claimed in claim 1 wherein:
said bobbin member includes a radially extending projection extending externally of said magnet body to provide an anti-rotation tab adapted for connection to fixed mounting structure.

References Cited
UNITED STATES PATENTS

| | | | |
|---|---|---|---|
| 2,977,310 | 5/1954 | Campbell | 192—84 |
| 2,976,093 | 3/1961 | Reiling | 192—110 |
| 2,985,037 | 5/1961 | Schoenle et al. | 192—18.2 |
| 3,195,703 | 7/1965 | Comstock | 192—84 |

CARLTON R. CROYLE, *Primary Examiner.*

C. M. LEEDOM, *Assistant Examiner.*